(12) United States Patent
Misiak et al.

(10) Patent No.: US 6,204,309 B1
(45) Date of Patent: Mar. 20, 2001

(54) FLUORESCENT CYANOACRYLATE ADHESIVE

(75) Inventors: Hanns R. Misiak, Wenningen; Heinz C. Nicolaisen, Ronnenberg; Annette Schroeter, Nordstemmen; Dagmar Behn, Hannover, all of (DE)

(73) Assignee: Henkel Kommanditgesellschaft auf Aktien, Duesseldorf (DE)

( * ) Notice: Subject to any disclaimer, the term of this patent is extended or adjusted under 35 U.S.C. 154(b) by 0 days.

(21) Appl. No.: 09/297,190

(22) PCT Filed: Oct. 17, 1997

(86) PCT No.: PCT/EP97/05753

§ 371 Date: Apr. 23, 1999

§ 102(e) Date: Apr. 23, 1999

(87) PCT Pub. No.: WO98/18876

PCT Pub. Date: May 7, 1998

(30) Foreign Application Priority Data

Oct. 25, 1996 (DE) .............................. 196 44 332

(51) Int. Cl.$^7$ .............................. C08J 3/28; B32B 27/36; B32B 27/30
(52) U.S. Cl. .................... 523/300; 252/182.15; 428/412; 428/500; 428/522; 522/79
(58) Field of Search ................ 252/182.15; 428/412, 428/500, 522; 522/79; 523/300

(56) References Cited

U.S. PATENT DOCUMENTS

| | | | |
|---|---|---|---|
| 3,254,111 | 5/1966 | Hawkins et al. | 260/465.4 |
| 3,654,340 | 4/1972 | Banitt | 260/465.4 |
| 4,556,700 | * 12/1985 | Harris et al. | 526/209 |
| 4,751,020 | 6/1988 | Marten et al. | 252/301.21 |

FOREIGN PATENT DOCUMENTS

| | | |
|---|---|---|
| 0 105 062 | 4/1984 | (EP) . |
| 0 213 893 | 3/1987 | (EP) . |
| 0 222 333 | 5/1987 | (EP) . |
| 2 228 943 | 9/1990 | (GB) . |
| 59-122567 | 7/1984 | (JP) . |
| WO95/33708 | 12/1995 | (WO) . |

OTHER PUBLICATIONS

Patent Abstracts of Japan, vol. 008, No. 241 (1984).

Database WPI, Derwent Publications, Class A81, AN84–201532.

Ullmann's Encyclopedia of Industrial Chemistry, vol. A1, (1985) p. 240.

* cited by examiner

*Primary Examiner*—Kriellion Sanders
(74) *Attorney, Agent, or Firm*—Wayne C. Jaeschke; Stephen D. Harper

(57) ABSTRACT

Cyanoacrylate adhesive containing a pyrylium salt as a fluorescent dye are useful for bonding various substrates, particularly transparent plastics. The pyrylium salt may be present in relatively large quantities in the adhesive without any adverse effect on the storage stability and adhesive properties, yet shows very little inherent coloration in visible light.

25 Claims, No Drawings

FLUORESCENT CYANOACRYLATE ADHESIVE

BACKGROUND OF THE INVENTION

1. Field of the Invention

This invention relates to a cyanoacrylate adhesive containing a pyrylium salt as a fluorescent dye and to its use.

2. Discussion of Related Art

Adhesives of this type are already known. Thus, EP 0 105 062 B1 describes a cyanoacrylate adhesive containing at least one dye from the group consisting of C.I. Solvent Green 5, C.I. Acid Red 50 and C.I. Acid Red 52 in a quantity of 5 to 1000 ppm, based on the monomers. The disadvantage of these dyes lies in their bright, clearly visible color, particularly where the parts to be joined are transparent. In addition, the dyes are poorly soluble in the monomers. Accordingly, it is not possible to prepare a master batch of cyanoacrylates and the dye, i.e. a stock mixture of cyanoacrylates with a high concentration of dye which the user himself is then able to dilute to the extent required by the particular situation.

Against the background of this prior art, the problem addressed by the present invention was to provide a cyanoacrylate adhesive containing a fluorescent dye, the dye showing very little, if any, inherent coloration in visible light and lending itself to use in relatively large quantities without any adverse effect on the storage stability and adhesive properties of the adhesive.

SUMMARY OF THE INVENTION

The solution provided by the invention is defined in the claims and consists in a highly specific choice of the pyrylium salt. The cyanoacrylate adhesives according to the invention are characterized by an effective concentration of at least one pyrylium salt corresponding to the following general formula:

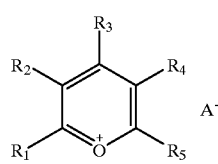

(I)

in which $R_1$ to $R_5$ represent hydrogen, alkyl and aryl groups or a fused aromatic radical at two vicinal positions. The substituents may in turn bear alkyl, aryl, alkoxy, aryloxy groups, halogen or pseudohalogen atoms. The total number of carbon atoms in the substituents should be from 1 to 18 and, more particularly, from 6 to 10. The substituents may be the same or different. The counterion $A^-$ may be selected from non-nucleophilic anions such as, for example, hexafluorophosphate, hexafluoroantimonate, tetrafluoroborate, perchlorate and tetrachloroferrate. Dyes used in accordance with the invention include 2,4,6-triphenyl pyrylium tetrafluoroborate, 2,4,6-triphenyl pyrylium trifluoromethane sulfonate, 2,4-ditert-butyl-6-(2-methoxyphenyl)-pyrylium tetrafluoroborate, 1,4-phenylene-4,4"-bis-(2,6-diphenyl-4-pyrylium tetrafluoroborate), 2,4-diphenyl-6-(4-methoxyphenyl)pyrylium perchlorate; 2,4-diphenyl-6-(p-tolyl)-pyrylium tetrachloroferrate.

DETAILED DESCRIPTION OF THE INVENTION

The dyes are present in the adhesive in concentrations of 5 to 50,000 ppm and, more particularly, 20 to 10,000 ppm.

The adhesive is preferably free from solvents or solubilizers for the dyes and the monomers. Solvents are preferably used where a concentration of more than 0.3% by weight of dye is to be dissolved.

The following example illustrates the high solubility of the dyes used in accordance with the invention:

2,4,6-triphenyl pyrylium tetrafluoroborate

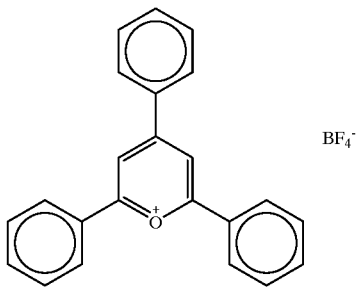

can be introduced into ethyl cyanoacrylate at room temperature in a quantity of up to about 2.5%. By contrast, other dyes, such as for example Acid Red 50 and Acid Red 52, only dissolve in concentrations of up to a few hundred ppm at room temperature.

This high concentration enables the master batch process to be applied. If, for example, the stock solution has a concentration of 2.5% by weight, the user can easily dilute it to the required concentration without encountering dosage or homogeneity problems. The stock solution preferably has a concentration of 0.1 to 5% by weight of pyrylium salt (the upper limit being determined by the solubility factor).

Another unexpected advantage of the dyes used in accordance with the invention is their fastness to light. In the liquid state, a cyanoacrylate adhesive colored with the pyrylium salts mentioned above shows no reduction in fluorescence intensity, even after several minutes' exposure to UV light (254 and 365 nm).

In addition, the relatively low inherent coloration of the dyes used in accordance with the invention in visible light enables them to be universally used because bonds established with the correspondingly colored adhesives do not show any visible inherent coloration in the adhesive joint, even where the joined parts are transparent. They fluoresce on exposure to short-wave light. The fluorescence signal reflected by the adhesive present on the substrate enables the application of the adhesive to be controlled with the assistance of a luminescence probe.

In the context of the invention, "α-cyanoacrylates" are understood to be both typical monocyanoacrylates and also biscyanoacrylates.

"Typical monocyanoacrylates" encompass compounds corresponding to the following general formula:

in which R is an alkyl, alkenyl, cycloalkyl, aryl, alkoxyalkyl, aralkyl or haloalkyl group containing 1 to 24 carbon atoms and, more particularly, 1 to 12 carbon atoms, more especially a methyl, ethyl, n-propyl, isopropyl, n-butyl, isobutyl, pentyl, hexyl, allyl, methallyl, crotyl, propargyl, cyclohexyl, benzyl, phenyl, cresyl, 2-chloroethyl, 3-chloropropyl, 2-chlorobutyl, trifluoroethyl, 2-methoxyethyl, 3-methoxybutyl, 2-methoxyisopropyl and 2-ethoxyethyl group. The cyanoacrylates mentioned above are known to the expert on adhesives, cf. Ullmann's Encyclopaedia of Industrial Chemistry, Vol. A1, page 240, Verlag Chemie Weinheim (1985) and U.S. Pat. No. 3,254,111 and U.S. Pat. No. 3,654,340. Preferred monomers are the allyl, methoxyethyl, ethoxyethyl, methyl, ethyl, propyl, isopropyl or butyl esters of 2-cyanoacrylic acid.

"Bis(cyanoacrylates)" are understood to be compounds corresponding to the following general formula:

$$[H_2C=C(CN)-CO-O]_2R^6 \quad (III)$$

in which $R^6$ is a branched or unbranched difunctional alkane radical containing 2 to 18 and, more particularly, 6 to 12 carbon atoms which may additionally contain hetero atoms, such as halogens and oxygen, or aliphatic or aromatic rings. However, $R^6$ is preferably a pure hydrocarbon.

It is important that the bis(cyanoacrylates) should be particularly pure. This requirement is satisfied, for example, by the following methods of production and purification. Essentially, monocyanoacrylates are transesterified with diols and the reaction mixtures are then worked up by fractional crystallization. Accordingly, a suitable method for the production of biscyanoacrylates comprises transesterifying 2-cyanoacrylic acid or alkyl esters thereof corresponding to the following general formula:

$$H_2C=C(CN)-CO-O-R^7 \quad (IV)$$

in which $R^7$ is a branched or unbranched radical containing 1 to 6 carbon atoms, with diols corresponding to the following general formula:

$$[HO]_2R^1 \quad (V)$$

in which $R^1$ is a branched or unbranched difunctional alkane radical containing 2 to 18 carbon atoms which may additionally contain hetero atoms, such as halogens and oxygen, or aliphatic or aromatic rings, to form bis(cyanoacrylates) corresponding to general formula III and then purifying the reaction mixture by fractional crystallization. Further particulars can be found in WO 95/33708.

Besides these two key components, the cyanoacrylate adhesive also contains typical stabilizers, for example hydroquinone, sulfur dioxide, boron trifluoride and methane sulfonic acid, in the usual quantities.

In addition, the adhesive according to the invention may contain other additives, for example plasticizers, activators or accelerators, thickeners and/or elasticizers, coupling agents and other dyes.

The adhesives according to the invention are prepared in the usual way by mixing the components.

The adhesives according to the invention may be used for bonding typical substrates, more particularly substrates of the same material or of different materials, for example metal, elastomers and plastics, and above all for bonding transparent substrates of polystyrene, polymethyl methacrylate and polycarbonate.

The invention is illustrated by the following Examples.

EXAMPLES

1. Reactivity and Stability in Storage

The substances 2,4,6-triphenyl pyrylium tetrafluoroborate and 2,4,6-triphenyl pyrylium trifluoromethane sulfonate were added in concentrations of 50 ppm to 1,000 ppm (see Table 1) to ethyl α-cyanoacrylate stabilized with 500 ppm of hydroquinone and 10 ppm of $SO_2$. The additions readily dissolved in the ethyl cyanoacrylate by brief shaking.

The samples thus prepared were evaluated according to various criteria to determine whether the fluorescent additives had any effect on the reaction rate and/or storage stability of cyanoacrylate adhesives. Viscosity was measured both shortly after preparation of the samples and also after storage for 10 days at 70° C. (recirculating air heating cabinet) in polyethylene bottles.

The curing rate was determined as the setting time on a round EPDM foam rubber cord (diameter 15 mm) as follows:

The EPDM foam rubber cord was freshly cut. 1 to 2 drops of adhesive were applied to the surface and the ends of the rubber cord were immediately joined together. The setting time was determined as the time taken to establish flexing resistance.

The tests show that the adhesives according to the invention have virtually the same stability in storage and setting time as the unmodified adhesives.

| | Type and concentration [ppm] of the compound added | | Setting time on EPDM | Viscosity [mPas] as measured by the cone/plate method at 20° C. | |
|---|---|---|---|---|---|
| Test No. | 2,4,6-Triphenyl pyrylium tetrafluoroborate | 2,4,6-Triphenyl pyrylium trifluoromethane sulfonate | [secs.] After production | After production | After storage for 10 days at 70° C. |
| 1 | 0 | 0 | 3 | 2.4 | 4.5 |
| 2 | 50 | 0 | 3 | 2.3 | 5.2 |
| 3 | 100 | 0 | 3 | 2.6 | 4.8 |
| 4 | 300 | 0 | 3 | 2.5 | 5.4 |
| 5 | 500 | 0 | 3 | 2.4 | 5.7 |
| 6 | 1000 | 0 | 4 | 2.5 | 6.2 |
| 7 | 0 | 50 | 3 | 2.5 | 4.7 |
| 8 | 0 | 100 | 3 | 2.7 | 5.2 |
| 9 | 0 | 300 | 3 | 2.7 | 5.2 |
| 10 | 0 | 500 | 3 | 2.6 | 5.7 |
| 11 | 0 | 1000 | 5 | 2.8 | 6.0 |

II. Solubility

Various quantities of the following substances were dissolved in various cyanoacrylic acid esters each stabilized with 1,000 ppm of hydroquinone and 50 ppm of sulfur dioxide in order to evaluate dissolving behavior:

| Test No. | Type and concentration [% by weight] of the compound added | | Monomer base α-Cyanoacrylate |
|---|---|---|---|
| | 2,4,6-Triphenyl pyrylium tetrafluoroborate | 2,4,6-Triphenyl pyrylium trifluoromethane sulfonate | |
| 12 | 0.1 | | Ethyl cyanoacrylate |
| 13 | 0.5 | | Ethyl cyanoacrylate |
| 14 | 1.0 | | Ethyl cyanoacrylate |
| 15 | 2.5 | | Ethyl cyanoacrylate |
| 16 | | 0.1 | Ethyl cyanoacrylate |
| 17 | | 0.5 | Ethyl cyanoacrylate |
| 18 | | 1.0 | Ethyl cyanoacrylate |
| 19 | | 2.5 | Ethyl cyanoacrylate |
| 20 | 0.5 | | Methyl cyanoacrylate |
| 21 | 0.5 | | n-Propyl cyanoacrylate |
| 22 | 0.5 | | n-Butyl cyanoacrylate |
| 23 | 0.5 | | Isopropyl cyanoacrylate |
| 24 | 0.5 | | Methoxyethyl cyanoacrylate |

The fluorescent additives were completely dissolved in concentrations of up to 2.5% by automatic shaking for 8 hours at room temperature.

For comparison, other fluorescent dyes (C.I. Acid Red 50 and C.I. Acid Red 52) were tested for their solubility in ethyl cyanoacrylate. Both fluorescent dyes—in concentrations of 0.1%—had dissolved only partly after shaking for 24 hours at room temperature.

III. Fluorescence Stability

The fluorescence property was determined using an Erwin Sick LUT 1-4 Lumineszenztaster (luminescence probe), lens 133.

The luminescence probe emits modulated ultraviolet light with a wave length of 365 nm and responds to light of the same modulation frequency in the wave length range from ca. 450 to 1000 nm. The distance from the lens to the adhesive was 40 mm. 10 mg drops of adhesive were applied to a glass slide; drop diameter on the surface ca. 5 mm.

In addition to tests 25 to 29, other dyes were tested for their fluorescence:

Stabilization: 10 ppm $SO_2$ and 500 ppm hydroquinone; ester base: cyanoacrylate:

| Dye | Concentration | Measuring signal units as fluorescence intensity | |
|---|---|---|---|
| | | Immediately after application (beginning) | After irradiation for 5 minutes |
| 2,4-Di-t-butyl-6-(2-methoxy-phenyl)-pyrylium tetrafluoroborate | 109 ppm | 9 | 5 |
| | 500 ppm | 33 | 30 |
| 1,4-phenylene4,4'-bis(2,6-di-phenyl-4-pyrylium tetrafluoroborate) | 500 ppm | 19 | 15 |
| | 750 ppm | 22 | 19 |
| | 1000 ppm | 15 | 12 |
| 2,4-Diphenyl-6-(4-methoxy-phenyl) pyrylium perchlorate | 100 ppm | 97 | 95 |
| | 300 ppm | >99 | >99 |
| 2,4-Diphenyl-6-(p-tolyl)pyrylium tetrachloroferrate | 100 ppm | 90 | 87 |
| | 300 ppm | >99 | >99 |

For comparison, the fluorescence dye C.I. Solvent Green 5 was dissolved in an ethyl cyanoacrylate (stabilized with 500 ppm hydroquinone and 10 ppm $SO_2$) in concentrations of 0.01 and 0.03%. Fluorescence measurement using the same test arrangement produced an intensity signal of 10 units (beginning) and 8 units (after 5 minutes) in the case of the sample containing 0.01% C.I. Solvent Green 5 and an intensity signal of 35 units (beginning) and 30 units (after 5 minutes) in the case of the sample containing 0.03% C.I. Solvent Green 5.

What is claimed is:

1. A method for bonding substrates which comprises: applying to at least one of the substrates to be bonded a layer of an adhesive comprising at least one

| Test No. | Type and concentration [% by weight] of the compound added | | Monomer base α-Cyanoacrylate[1] | Measuring signal units as fluorescence intensity[2] | |
|---|---|---|---|---|---|
| | 2,4,6-Triphenyl pyrylium tetrafluoroborate | 2,4,6-Triphenyl pyrylium trifluoromethane sulfonate | | Immediately after application (beginning) | After irradiation for 5 minutes |
| 25 | 0.01 | | Ethyl cyanoacrylate | 55 | 50 |
| 26 | 0.03 | | Ethyl cyanoacrylate | >99[3] | >99[3] |
| 27 | 0.05 | | Ethyl cyanoacrylate | >99[3] | >99[3] |
| 28 | | 0.01 | Ethyl cyanoacrylate | 80 | 78 |
| 29 | | 0.03 | Ethyl cyanoacrylate | >99[3] | >99[3] |

[1] Stabilized with 500 ppm of hydroquinone and 10 ppm of $SO_2$
[2] Luminescence probe
[3] Input amplifier of the luminescence gauge overdriven α-cyanoacrylate and a pyrylium salt of the formula:

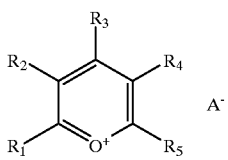

in which $R_1$ to $R_5$ represent independently hydrogen, an alkyl group containing 1–18 carbon atoms, an aryl group containing 1–18 carbon atoms and an aromatic group containing up to 18 carbon atoms fused at two vicinal positions, wherein $R_1$ to $R_6$ may be substituted with alkyl, aryl, alkoxy, aryloxy, halogen or pseudohalogen, and A comprises a non-nucleophilic counterion, joining the substrates and irradiating the adhesive with radiation of a wavelength which causes the adhesive to fluoresce wherein the irradiating is carried out before or after the substrates are joined.

2. The method of claim 1 wherein the pyrylium salt is present in the adhesive at a concentration of 5 to 50,000 ppm based on the adhesive as a whole.

3. The method of claim 1 wherein the at least one α-cyanoacrylate corresponds to the formula

wherein R is an alkyl, alkenyl, cycloalkyl, aryl, alkoxyalkyl, aralkyl or haloalkyl group containing 1 to 24 carbon atoms.

4. The method of claim 1 wherein the at least one α-cyanoacrylates corresponds to the formula

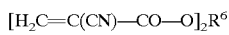

wherein $R^6$ is a branched or unbranched alkane group containing 2 to 18 carbon atoms and, optionally, heteroatoms, aliphatic rings, or aromatic rings.

5. The method of claim 1 wherein the adhesive additionally comprises one or more stabilizers.

6. The method of claim 1 wherein the adhesive additionally comprises at least one additive selected from the group consisting of plasticizers, activators, accelerators, thickeners, elasticizers, coupling agents, and dyes other than the pyrylium salt.

7. The method of claim 1, wherein the adhesive is free of solvent.

8. The method of claim 1, wherein said adhesive is in the form of a stock solution having a concentration of the pyrylium salt of from 0.1% to 5% by weight based on the stock solution as a whole.

9. The method of claim 1 wherein the counterion A⁻ is selected from the group consisting of hexafluorophosphate, trifluoromethane sulfonate, hexafluoroantimonate, tetrafluoroborate, perchlorate, and tetrachloroferrate.

10. The method of claim 1 wherein the number of carbon atoms in each of said alkyl groups, aryl groups or fused aromatic group is from 6 to 10.

11. The method of claim 1 wherein the substrates are the same or different and comprise at least one material selected from the group consisting of metal, elastomers, and plastics.

12. The method of bonding substrates of claim 1 comprising diluting an adhesive stock solution to a pyrylium salt concentration of 5 to 50,000 ppm based on the adhesive as a whole to obtain a diluted adhesive and using said diluted adhesive to join said substrates.

13. The method of claim 1 wherein the adhesive comprises one or more α-cyanoacrylates and from 5 to 50,000 ppm based on the adhesive as a whole of a pyrylium salt having the formula:

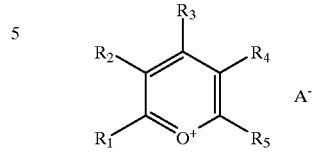

in which $R_1$ to $R_5$ are the same or different and represent hydrogen, an alkyl group, an aryl group or an aromatic group fused at two vicinal positions and the number of carbon atoms in each of said alkyl groups, aryl groups and fused aromatic group is 6 to 10, A⁻ comprising a non-nucleophilic counterion selected from the group consisting of hexafluorophosphate, hexafluoroantimonate, trifluoromethane sulfonate, tetrafluoroborate, perchlorate and tetrachloroferrate.

14. The method of claim 13 wherein the pyrylium salt is present at a concentration of from 20 to 10,000 ppm.

15. The method of claim 13, wherein the adhesive is free of solvent.

16. The method of claim 13 wherein the pyrylium salt is comprised of a pyrylium cation selected from the group consisting of 2,4,6-triphenyl-pyrylium, 2,4-ditert-butyl-6-(2-methoxyphenyl)-pyrylium, 1,4-phenylene-4,4"-bis-(2,6-diphenyl-4-pyrylium), 2,4-diphenyl-6-(4-methoxyphenyl)-pyrylium, and 2,4-diphenyl-6-(p-tolyl)-pyrylium.

17. The method of claim 13 wherein at least one of the α-cyanoacrylates is selected from the group consisting of allyl, methoxyethyl, ethoxyethyl, methyl, ethyl, propyl, isopropyl and butyl esters of 2-cyanoacrylic acid.

18. The method of claim 13 wherein at least one of the α-cyanoacrylates is a bis(cyanoacrylate) corresponding to the formula:

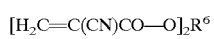

wherein $R^6$ is a branched or unbranched difunctional alkane group containing 6 to 12 carbon atoms.

19. The method of claim 13 wherein the adhesive additionally comprises at least one stabilizer selected from the group consisting of hydroquinones, sulfur dioxide, boron trifluoride, and methane sulfonic acid.

20. The method of claim 13 wherein the adhesive additionally comprises at least one additive selected from the group consisting of plasticizers, activators, accelerators, thickeners, elasticizers, coupling agents, and dyes other than the pyrylium salt.

21. The method of bonding substrates of claim 13, wherein the substrates are the same or different and comprise at least one material selected from the group consisting of metal, elastomers, and plastics.

22. The method of claim 21 wherein at last one of the substrates is transparent and the transparent substrate is selected from the group consisting of polystyrene, polymethyl methacrylate, and polycarbonate.

23. The method of claim 13 wherein the adhesive is prepared by diluting a stock solution comprised of one or more α-cyanoacrylates and 0.1 to 5% by weight, based on the stock solution as a whole, of a pyrylium salt having the formula:

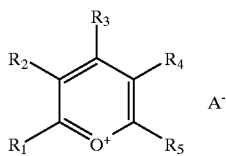

in which $R_1$ to $R_5$ are the same or different and represent hydrogen, an alkyl group, an aryl group or an aromatic groups fused at two vicinal positions and the number of carbon atoms in each of said alkyl groups, aryl groups, and fused aromatic groups is 6 to 10 and can be substituting with an alkoxy group, $A^-$ being a non-nucleophilic counterion selected from the group consisting of hexafluorophosphate, hexafluoroantimonate, trifluoromethane sulfonate, tetrafluoroborate, perchlorate and tetrachloroferrate.

24. The method of claim 23 wherein the pyrylium salt is comprised of a pyrylium cation selected from the group consisting of 2,4,6-triphenyl-pyrylium, 2,4-ditert-butyl-6-(2-methoxyphenyl)-pyrylium, 1,4-phenylene-4,4"-bis-(2,6-diphenyl-4-pyrylium), 2,4-diphenyl-6-(4-methoxyphenyl)-pyrylium, and 2,4-diphenyl-(p-tolyl)-pyrylium.

25. The method of bonding substrates of claim 23; wherein the substrates are the same or different and at least one substrate is a transparent plastic selected from the group consisting of polystyrenes, polymethyl methacrylates, and polycarbonates and wherein the stock solution is diluted to a pyrylium salt concentration of 20 to 10,000 ppm to form the adhesive.

\* \* \* \* \*

UNITED STATES PATENT AND TRADEMARK OFFICE
CERTIFICATE OF CORRECTION

PATENT NO.    : 6,204,309 B1                                                                Page 1 of 1
DATED         : March 20, 2001
INVENTOR(S)   : Misiak et al.

It is certified that error appears in the above-identified patent and that said Letters Patent is hereby corrected as shown below:

Column 7,
Line 1, delete ":", and insert therefor -- ; --.
Line 15, after "wherein", insert -- , --.
Line 15, delete "$R_6$", and insert therefor -- $R_5$ --.
Line 17, after "and", delete "A", and insert therefor -- $A^-$ --.
Line 49, delete "0.1%", and insert therefor -- 0.1 --.

Column 9,
Line 11, delete "groups", and insert therefor -- group --.
Line 13, delete "substituting", and insert therefor -- substituted --

Column 10,
Line 6, delete "2,4-diphenyl-(p-tolyl)-pyrylium", and insert therefor -- 2,4-diphenyl-6-(p-tolyl)-pyrylium --.
Line 7, delete ";", and insert therefor -- , --.

Signed and Sealed this

Nineteenth Day of August, 2003

JAMES E. ROGAN
*Director of the United States Patent and Trademark Office*